J. A. LEACH, Jr.
PNEUMATIC TIRE AND FASTENER THEREFOR.
APPLICATION FILED JULY 19, 1913.
1,090,727. Patented Mar. 17, 1914.
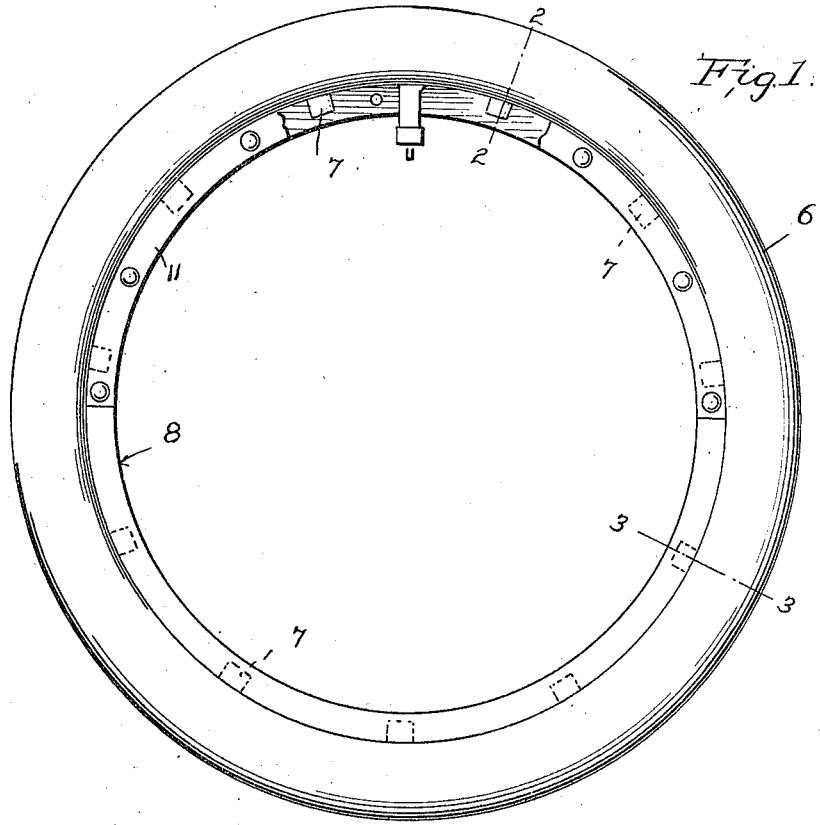
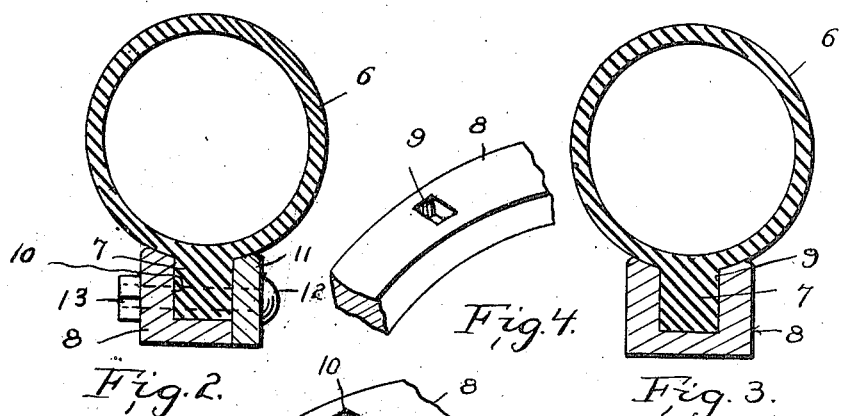
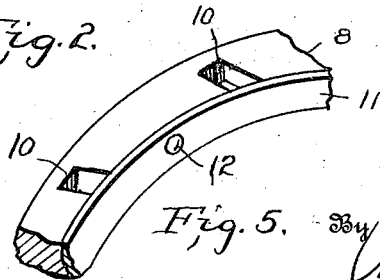

UNITED STATES PATENT OFFICE.

JOHN A. LEACH, JR., OF EFFINGHAM, SOUTH CAROLINA.

PNEUMATIC TIRE AND FASTENER THEREFOR.

1,090,727.  Specification of Letters Patent.  Patented Mar. 17, 1914.

Application filed July 19, 1913. Serial No. 779,991.

*To all whom it may concern:*

Be it known that I, JOHN A. LEACH, Jr., a citizen of the United States, residing at Effingham, in the county of Florence and State of South Carolina, have invented certain new and useful Improvements in Pneumatic Tires and Fasteners Therefor; and I do hereby declare the following to be a full, clear, and exact description of the invention, such as will enable others skilled in the art to which it appertains to make and use the same.

My invention relates to improvements in tires of that type known as single tube, and resides in the provision of lugs formed on the tire and adapted to coöperate with a specially constructed rim.

An important object of my invention is the provision of a device of the above mentioned character, comprising lugs formed on the tire and adapted to coöperate with recesses formed in the rim, and means for locking the tire upon the rim.

A further important object of my invention is to construct a device of the above mentioned character, which will be reliable and efficient in its operation and may be constructed of few parts, thereby lessening the cost of manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a side elevation of my tire and fastener therefor assembled, Fig. 2 is a transverse sectional view taken on the line 2—2 of Fig. 1, showing the removable plate in its operable position, Fig. 3 is a similar view, taken on the line 3—3 of Fig. 1, Fig. 4 is a detail perspective view of a portion of the rim, showing one of the centrally disposed circular recesses therein, and Fig. 5 is a detail perspective view of a portion of the rim, showing the laterally extending recess and the removable plate secured to the rim.

Proceeding now to the description of the drawings, the numeral 6 designates as an entirety my specially constructed tire which is provided centrally of its under surface with a plurality of rectangular lugs 7, arranged in spaced relationship.

The rim, designated 8 as an entirety, is provided with a plurality of rectangular recesses 9 centrally thereof upon its outer surface for a distance equivalent to half of its circumference. Each of the centrally disposed rectangular recesses 9 is arranged in the same spaced relation as are the lugs 7 formed on the tire 6. The other half of the rim 8 is provided with a plurality of equidistantly spaced lateral recesses 10, communicating with the atmosphere adjacent one of the side edges of the rim 8.

A semicircular plate 11 is removably secured to the rim 8 adjacent the portion of the wheel which is provided with the laterally extending recesses 10, and is adapted to close the side openings of the recesses 10. A bolt 12 is inserted transversely through the rim 8 and removable plate 11, and is adapted to receive the nut 13 upon one terminal thereof to hold the plate 11 in engagement with the rim 8. It is obvious that any suitable fastening means may be employed in connection with securing the plate 11 to the rim 8, and that the illustrated form is the preferred embodiment of the same.

In assembling the tire, the operation may be briefly described as follows: Certain of the lugs 7 formed on the tire 6 are fitted within the rectangular recesses 9 which are disposed centrally of the rim 8, whereby the other lugs of the tire are in proper spaced relationship with the laterally extending openings 10. The lugs adjacent the side openings of the laterally extending openings 10 are then fitted within them and the plate 11 is bolted, or otherwise secured, after the manner described to the rim 8 adjacent the side openings of the recess 10; whereby the tire is locked against accidental derangement from the rim 8. It will thus be seen that an efficient and reliable means for fastening the tire of my improved construction to the tire rim is provided by the coöperating action of the tire and rim aforementioned.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus described my invention, what I claim is:

The combination with a tire of a plurality of rectangular spaced lugs formed integral therewith upon the inner side thereof, a rim provided upon half its circumference with a plurality of spaced rectangular recesses disposed centrally of the side edges of said rim and upon the other half of its circumference with a plurality of spaced laterally extending recesses open at one end adjacent the side edges of the rim and closed at its other end adjacent the other side edge of the rim, said lugs adapted to be fitted within said recesses, a semi-circular plate removably mounted upon said rim adjacent the open ends of said laterally extending recesses and disposed flush at its inner and outer terminals with the inner and outer faces of said rim.

In testimony whereof I affix my signature in presence of two witnesses.

JOHN A. LEACH, Jr.

Witnesses:
A. W. BROWN,
C. E. HYMAN.